United States Patent [19]

DiFrancesco

[11] Patent Number: 5,771,109
[45] Date of Patent: Jun. 23, 1998

[54] METHOD AND APPARATUS FOR DIGITIZING FILMS USING A STROBOSCOPIC SCANNING SYSTEM

[75] Inventor: David DiFrancesco, Englewood, Calif.

[73] Assignee: Pixar, Richmond, Calif.

[21] Appl. No.: 651,164

[22] Filed: May 17, 1996

[51] Int. Cl.⁶ .................................................. H04N 1/46
[52] U.S. Cl. ......................... 358/507; 358/506; 205/228
[58] Field of Search ............................ 382/132; 358/474, 358/475, 480, 481, 486, 487, 491, 500, 506, 509, 510, 512, 501, 527; 355/32, 33, 37, 67; 348/97, 99, 100, 112, 131, 132

[56] References Cited

U.S. PATENT DOCUMENTS

| | | | |
|---|---|---|---|
| 3,584,147 | 6/1971 | Flory et al. | 348/97 |
| 3,584,148 | 6/1971 | Flory et al. | 178/7.2 |
| 3,637,937 | 1/1972 | Deveson et al. | 340/680 |
| 3,679,827 | 7/1972 | Boltz | 348/97 |
| 3,874,799 | 4/1975 | Isaacs et al. | 356/173 |
| 4,205,337 | 5/1980 | Millward | 348/104 |
| 4,255,764 | 3/1981 | Howe | 348/98 |
| 4,309,746 | 1/1982 | Rushworth | 362/259 |
| 4,310,847 | 1/1982 | Frohbach et al. | 348/104 |
| 4,319,280 | 3/1982 | Roos et al. | 348/97 |
| 4,330,793 | 5/1982 | Stemme et al. | 348/104 |
| 4,495,516 | 1/1985 | Moore et al. | 348/104 |
| 4,623,929 | 11/1986 | Johnson et al. | 315/241 S |
| 4,681,427 | 7/1987 | Plummer | 355/32 |
| 4,688,099 | 8/1987 | Funston | 348/96 |
| 4,729,015 | 3/1988 | Wagensonner | 348/104 |
| 4,942,305 | 7/1990 | Sommer | 250/574 |
| 5,155,586 | 10/1992 | Levy et al. | 348/104 |
| 5,249,056 | 9/1993 | Foung et al. | 348/97 |
| 5,537,203 | 7/1996 | Carr | 356/236 |
| 5,548,120 | 8/1996 | Parker et al. | 250/341.7 |

FOREIGN PATENT DOCUMENTS

| | | | |
|---|---|---|---|
| 498945 | 1/1939 | United Kingdom . | |
| 2011756 | 7/1979 | United Kingdom | H04N 3/36 |
| 2025731 | 1/1980 | United Kingdom | H04N 3/36 |

OTHER PUBLICATIONS

IMAGICA High Resolution Digital Film Scann IDS4000 Brochure.

Laser Based Color Film Recorder System With GaAs Microlaser, D. Difrancesco, 17–20, Jan. 1989.

High Resolution CCD Film Scanner For Special Effects Applications, Mike Davis et al., unpublished.

*Primary Examiner*—Thomas D. Lee
*Assistant Examiner*—Jerome Grant, II
*Attorney, Agent, or Firm*—Hecker & Harriman

[57] ABSTRACT

The present invention is a method and apparatus for digitizing film frames. The invention utilizes different colored strobe lights housed in an integrating sphere, instead of the prior art filter and shutter mechanism. The invention's control system flashes each strobe light in sequence for a predetermined time to expose a film frame to various color components. The various color components of the film frame are projected onto a CCD array with the aid of a lens. Each strobe light is flashed at a desired frequency and for the predetermined time in order to saturate the CCD array with the component of light corresponding to that strobe light. The color data corresponding to each color component are passed to digital signal processors for processing and storage. In one embodiment of the invention, the strobe lights are red, green, and blue strobe lights.

57 Claims, 5 Drawing Sheets

METHOD AND APPARATUS FOR DIGITIZING FILMS USING A STROBOSCOPIC SCANNING SYSTEM

BACKGROUND OF THE INVENTION

1. Field of the Invention

The present invention relates to the field of film digitizing apparatus.

2. Background Art

Film digitizing apparatus are used to transform images from film frames to digital data for storage and display by computer systems. FIG. 1 shows the functional blocks of a prior art film digitizing apparatus 100. A light source 104 emits white light toward film plane 102 which holds a film frame (not shown). A colored filter 105 is placed between light source 104 and film plane 102. Filter 105 is typically a red, green, or blue filter and permits only one of these basic colors to pass through. A lens 109 focuses onto a CCD array 110 the light component filtered by filter 105 (for example, the blue light component).

During operation of the prior art film digitizing apparatus 100, the white light emanating from light source 104 is filtered by colored filter 105. The component of light passing through filter 105 exposes the film frame held by film plane 102. After passage of a short time CCD array 110 becomes saturated with the color component of the film corresponding to colored filter 105. For example, if filter 105 is a blue filter, the CCD array becomes saturated with the blue color component of the film frame. The digitized color data are then fed from the CCD array to computer storage.

As stated above, according to the prior art, light source 104 is a white light source. The prior art white light source 104 typically consists of continuous wave xenon or halogen lamps. In order to expose CCD array 110 to the basic colors, namely, red, green, and blue, three different colored filters are utilized. A red filter is used to pass through only the red component of the white light. Likewise, a green filter is used to pass through the green light component, and a blue filter is used to pass through blue light component, of the white light emanating from light source 104. Each filter 105 is inserted between film plane 102 and light source 104 (or alternatively, between film plane 102 and lens 109) for a predetermined period of time. The filter is then removed and replaced with one of the other two filters for a predetermined period of time. Thus, each one of the red, green, and blue filters is sequentially inserted, removed, and replaced with a different colored filter. This ensures that only one of the three colors red, green, or blue is passed through to CCD array 110. According to the prior art, a shutter system is placed between the light source 104 and film plane 102. Alternatively, the shutter system is placed between film plane 102 and lens holder 109, or between lens holder 109 and CCD array 110.

The prior art requirement of using different colored filters in conjunction with a shutter system results in a number of disadvantages. For example, the prior art film digitizing apparatus requires a complicated mechanism for insertion and removal of filters. The prior art also requires precise timing for the shutter system in order to control the period of time during which the CCD array is exposed to each color component. The shutter system must also be synchronized with the filter switching mechanism in a manner such that while the filters are being switched white light is blocked from exposing the CCD array. Accordingly, the prior art film digitizing apparatus requires complicated and costly filter switching mechanism, shutter system, and timing and synchronization devices. The filter switching mechanism and the shutter system also require regular and costly maintenance. In addition to all of these disadvantages, the prior art filter switching mechanism is slow. Three different filters must be switched to digitize each film frame. A typical full length film has thousands of film frames. Thus, digitizing the entire film can take hours longer just for the time consumed in switching the three red, green, and blue filters.

Another difficulty with the prior art film digitizing apparatus is that the light produced by light source 104 is a "parallel light." In other words, the light generated by light source 104 is not uniformly distributed over film plane 102. Typically, the intensity of the light is larger in the center of film plane 102. This results in a non-uniform exposure of CCD array 110 and in a delay in saturating the edges of the CCD array. Sometimes additional optics or fiber optic face plates are used to correct this non-uniform exposure of the CCD array. However, this increases cost and also results in loss of light in the system.

The following patents disclose film digitizing apparatus. Flory (U.S. Pat. No. 3,584,147) discloses an apparatus for generating triggering pulses for actuation of a blue strobe light at desired times. According to Flory '147, light from the blue strobe light is transmitted forward to a camera through a film frame, two dichroic mirrors, and a lens system. A continuous yellow light is transmitted backward through the two dichromatic mirrors to a photo detector which develops the triggering pulses for actuating the blue strobe light. Flory (U.S. Pat. No. 3,584,148) discloses an apparatus for illuminating a film frame several times by a strobe light operating at a predetermined rate. The apparatus images the film onto a photosensitive surface. The apparatus includes rotating mirrors in the optical path to compensate for the motion of the film between successive strobe light flashes so that each film frame is imaged onto the same photosensitive area.

Deveson et al ("Deveson", U.S. Pat. No. 3,637,937) is directed to an apparatus for producing video signals from a photographic film. The Deveson apparatus attempts to overcome overexposure or underexposure of the photographic film such that the video signals accurately represent the image on the photographic film. Deveson uses a "variable density light filter" to vary the illumination of the film as a part of its apparatus.

Boltz (U.S. Pat. No. 3,679,827) is directed to an apparatus used in continuous film projection systems. Boltz attempts to maintain a light replica of a film frame stationary on a photosensitive camera tube while the film frame is in motion. In order to accomplish this, Boltz uses two partially light transmissive and partially light reflective devices in the optical path between the film frame and the camera tube. The devices are rotated such that the light replica of the film frame is transmitted to the camera tube when the film frame is in the center of a film gate and also when the film frame is about to leave the film gate.

Frohbach et al ("Frohbach", U.S. Pat. No. 4,310,847) discloses a film scanning system. According to Frohbach, an image is recorded on film at a television field rate. A portion of the film corresponding to a line in the image is illuminated. The illuminated portion is decomposed into its color components. The decomposed light from the illuminated portion of the film is imaged onto scanning photosensitive arrays. The scanned signals provided by the photosensitive arrays are recorded and used to provide television signals.

Moore et al ("Moore", U.S. Pat. No. 4,495,516) discloses an apparatus for producing video signals from a film's image. The apparatus has a CCD image sensor having an integral color filter array. The CCD image sensor is illuminated with an image from the film. A signal processor color corrects the signals produced by the sensor.

Johnson et al ("Johnson", U.S. Pat. No. 4,623,929) discloses an improved simmer current circuit for a strobe light in a video player. The strobe light is used to flash illuminate a photographic film for a solid state image sensor. A current sync circuit is used for drawing a simmer current from the strobe light to maintain an arc in the strobe light between sensor-illuminating flashes. The improved simmer current circuit ensures that the strobe light flashes only when the simmer current is off, thus reducing electromagnetic interference and increasing the quality of the video signal generated by the video player.

Funston (U.S. Pat. No. 4,688,099) discloses a video player having a strobe light for flash illuminating a photographic film for a solid state image sensor. A detector circuit produces a control signal that is a function of whether the illumination of the image sensor is above or below a saturation level of the image sensor. A microprocessor adjusts an exposure level signal in accordance with the control signal. The adjusted exposure level signal in turn adjusts the intensity and duration of the strobe light flash such that the image sensor is illuminated to a level close to its saturation level.

Levy et al ("Levy", U.S. Pat. No. 5,155,586) discloses a system for performing flare correction on digitized color film images. Each digitized image may include red, blue, and green color components corresponding to the film. Flare correction signals are digitally generated and used to compensate for undesired luminance variations from frame to frame for each color component.

Foung et al ("Foung", U.S. Pat. No. 5,249,056) discloses an apparatus for generating video signals from a photographic film. The apparatus includes a film transport for advancing or rewinding the film to position a film frame at a film gate. The apparatus also includes an image projector which detects when a film frame is positioned at the film gate and flashes a strobe light to project an image of that frame. The apparatus also has a video pickup system which receives the projected image and generates video signals corresponding to the image.

None of the patents discussed above has overcome the prior art's problem of slow, costly and complex film digitizing apparatus. More specifically, none of these patents has addressed the prior art' reliance on the filter switching mechanism and the shutter and optics system discussed above.

An article entitled "Laser Based Color Film Recorder System with GaAs Mircrolaser" by David DiFrancesco, printed in the Proceedings of SPIE-The International Society for Optical Engineering, 17–20 January 1989, pages 16–26 discusses use of red, green, and blue laser beams in color film recording. However, the article does not suggest a way to overcome the prior art's problem of slow, costly and complex film digitizing apparatus. Furthermore, the article does not address the prior art's reliance on the filter switching mechanism and the shutter system discussed above.

Thus, there is need in the art for a faster, simpler, more reliable, and less expensive film digitizing apparatus.

SUMMARY OF THE INVENTION

The present invention is a method and apparatus for digitizing film frames. The invention utilizes different colored strobe lights housed in an integrating sphere, instead of the prior art filter and shutter face plate mechanism. The invention's control system flashes each strobe light in sequence for a predetermined time to expose a film frame to various color components, all with Lambertian distributed flat fields. The various color components of the film frame are projected onto a CCD array with the aid of a lens. Each strobe light is flashed at a desired frequency and for the predetermined time in order to saturate the CCD array with the component of light corresponding to that strobe light. The color data corresponding to each color component are passed to digital signal processors for processing and storage. In one embodiment of the invention, the strobe lights are red, green, and blue strobe lights.

DETAILED DESCRIPTION OF THE INVENTION

A method and apparatus for digitizing film frames using a stroboscopic scanning system is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention is a unique method and apparatus for digitizing film frames. The invention overcomes the prior art disadvantages of using three colored filters and the complications associated with the insertion and switching filters upon passage of predetermined time intervals. The invention also overcomes the need for using a shutter and synchronizing it with the filter switching system to block unwanted light from passing through to the CCD array. The invention also overcomes the need for field flattening optics or fiber face plates for even distribution of light over the film plane.

Figure 1:
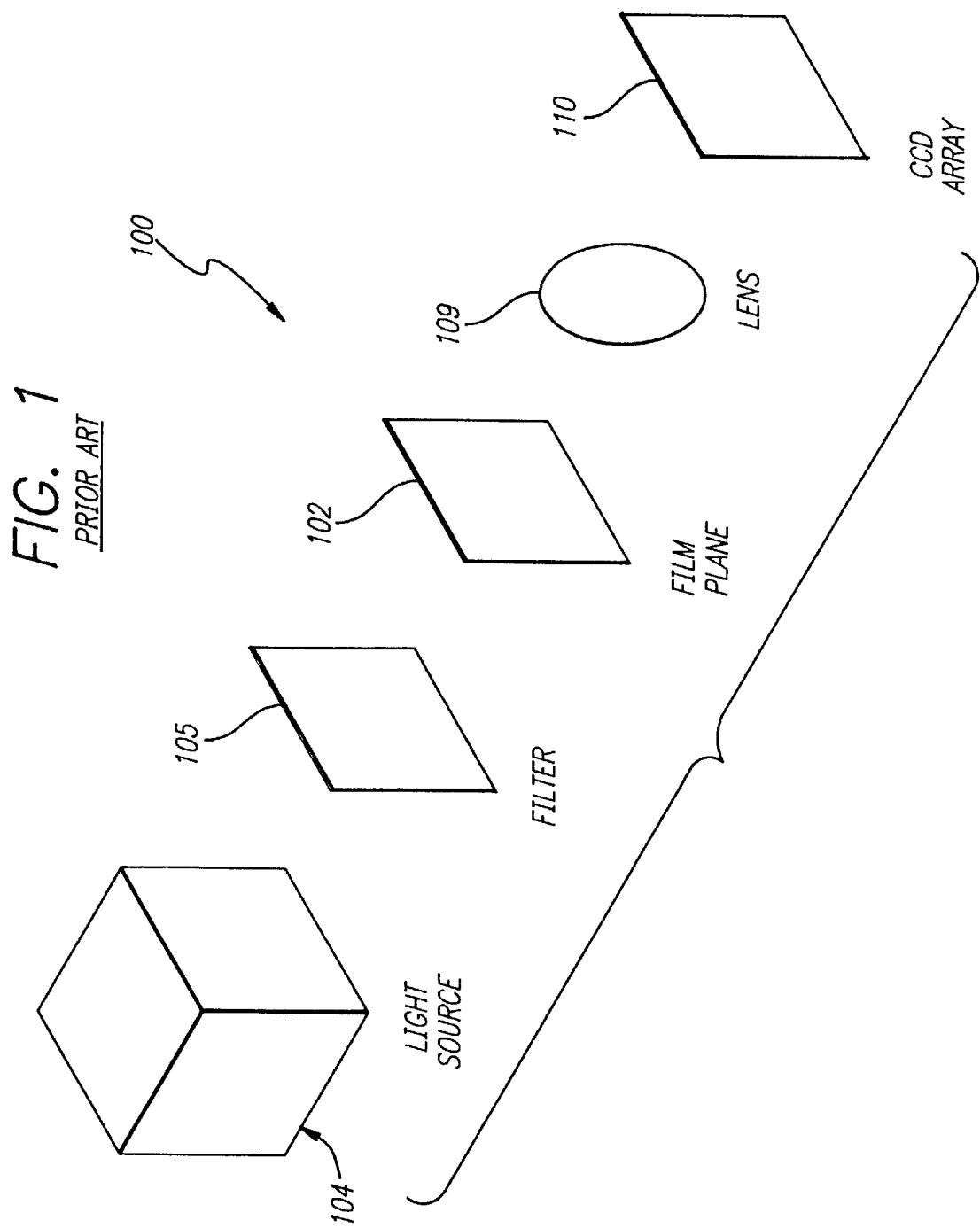
FIG. 1 is a functional block diagram of a prior art film digitizing apparatus.
Figure 2:
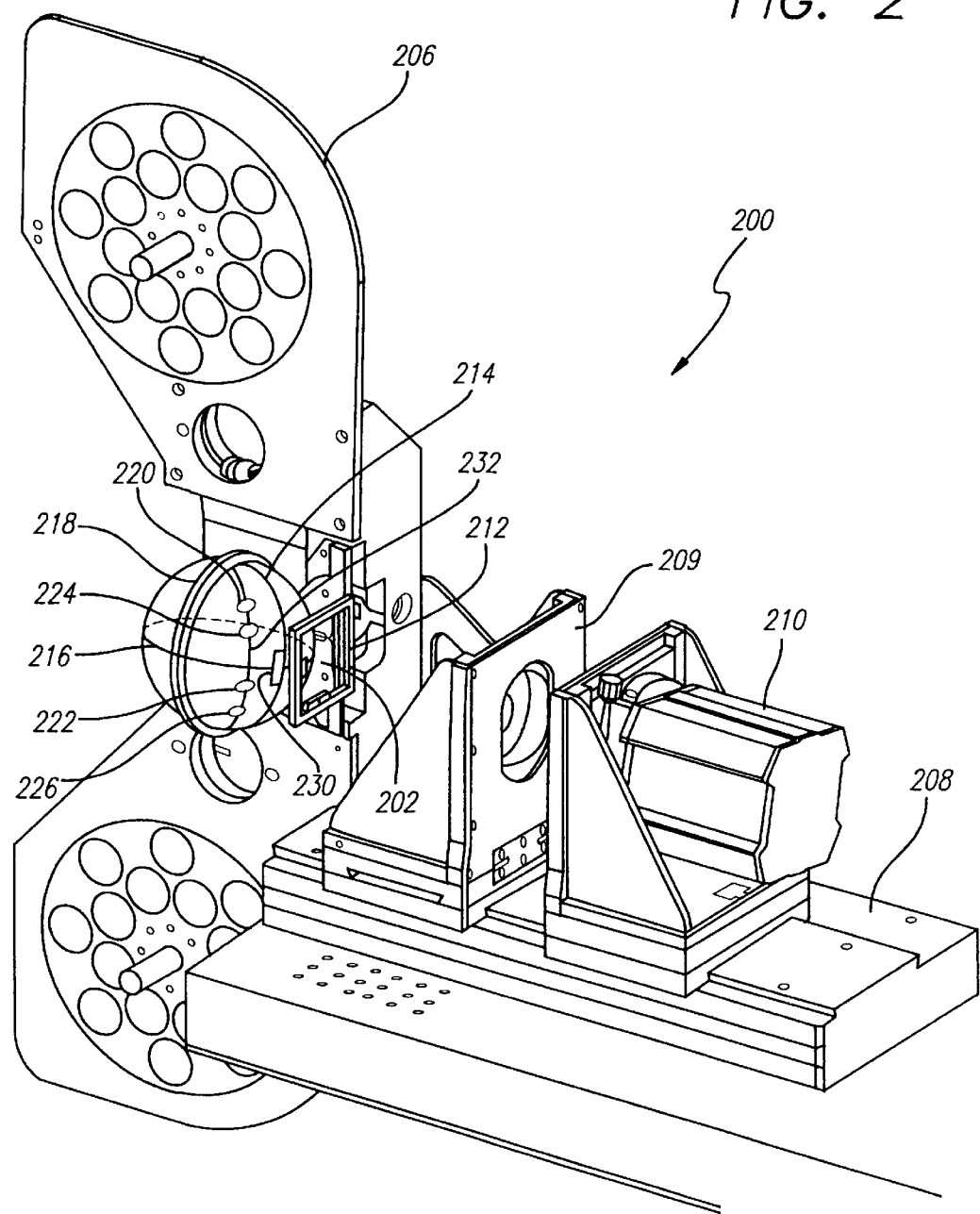
FIG. 2 illustrates an embodiment of the invention's film digitizing apparatus.

FIG. 2 shows an embodiment of the invention's film digitizing apparatus 200 using the invention's stroboscopic scanning system. Instead of the prior art's white light source 104, the invention uses an "integrating sphere" 204 as the source of light for the film digitizing apparatus. A film plane 202 is utilized to hold a frame of film (not shown) during the operation of the film digitizing apparatus. The double-arrowed line 212 shows the length of one side of the aperture of film plane 202. In one embodiment of the invention the aperture is a square with each side having a length of 35 millimeters. A "film transport" 206 is used to move the film as it is exposed to the light emitted from integrating sphere 204. A "dove tail" 208 is used for holding lens holder 209 and CCD camera 210. CCD camera 210 contains an array of CCD's (not shown in FIG. 2) which is exposed to light emitted from integrating sphere 204 through a film frame placed in film plane 202.

Discussing the structure of the invention's apparatus in more detail, instead of the prior art's filter and shutter mechanism discussed above, the invention utilizes integrating sphere 204 which houses four strobe lights. One red strobe light, one green strobe light, and two blue strobe lights (a single blue strobe light, instead of two blue strobe lights, may also be used as another embodiment of the invention).

Reference is made to integrating sphere 204 shown in FIG. 2. Integrating sphere 204 is shown in more detail in FIG. 3. Like numbers in FIGS. 2 and 3 refer to like components. Referring to integrating sphere 204 shown in FIGS. 2 and 3, in one embodiment of the invention four strobe lights are placed along meridian 232 of the integrating sphere (manifestly, the exact location of the four strobe lights can be varied without departing from the scope of the present invention). Meridian 232 lies in a plane that is perpendicular to a plane containing equator 216. Each strobe light lies along meridian 232 in a plane parallel to the plane of equator 216. Each strobe light is pointed towards the inside of the integrating sphere and is housed in an opening in the outer surface of the integrating sphere. Each opening has a diameter of 25 millimeters. Thus, four openings each with a diameter of 25 millimeters are distributed along meridian 232. Two of the openings (openings 222 and 224) are located on each side of the plane of equator 216 and are equidistant from the equator. The other two openings (220 and 226) are also on opposite sides of the equator and are equidistant from the equator. As an example, in one embodiment of the invention a red strobe light is placed in opening 220, a green strobe light in opening 224, a blue strobe light in opening 222, and another blue strobe light is placed in opening 226.

Integrating sphere 204 also includes a rectangular aperture 230 at the apex of meridian 214. The plane of meridian 214 is perpendicular to a plane containing meridian 218. Meridian 232 (on which the strobe lights are placed) is at 45° angle with respect to meridian 214. Meridian 232 is thus half-way between meridians 214 and 218. The light generated by the strobes and reflected from the internal surface of integrating sphere 204 is focused onto film plane 202 by passing through aperture 230 with Lambertian distribution.

The internal surface of integrating sphere 204 is coated by a substance comprised of rare-earth metals for increased reflectivity. The coating increases the radiance of the internal surface of the integrating sphere so that the internal surface is approximately ninety to ninety seven percent efficient in reflecting the light provided by the strobes. Integrating sphere 204 provides a Lambertian distribution of light for exposing a film frame to the CCD camera. This overcomes the prior art's need to diffuse and "make flat" a parallel light source for exposing the film frame to the CCD camera.

In the preferred embodiment of the invention, film transport 206 is a modified wide-body version of the Albert Howell design circa 1911 which is a cam operated, pin-registered, film shuttle mechanism used in the optical camera manufacturing industry. The shuttle mechanism and film plane 202 can accommodate various film formats such as "35 Academy," "65 mm," and "35 Vistavision"("8 Perf"). The invention utilizes a 75 millimeter Rodenstock lens placed in lens holder 209. The CCD camera 210 (FIG. 2) holds a CCD array with a size of 3×k×2k pixels. The invention can also include a moving lens mechanism as described in the co-pending patent application, Ser. No. 08/664,266 filed on Jun. 11, 1996, assigned to the assignee of the present application and incorporated herein by reference. The invention may also utilize a column of CCD's, instead of the array of CCD's discussed above. In another embodiment of the invention, photo-sensitive sensors other than CCD sensors are utilized.

Figure 4:
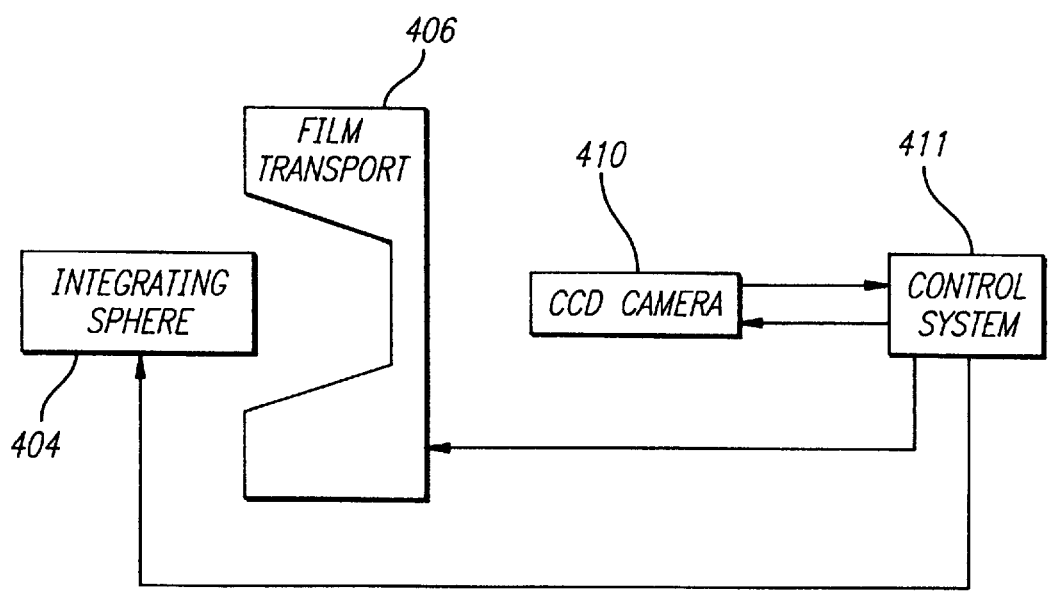
FIG. 4 is an overview of the control system of the present invention.

FIG. 4 shows a system level overview of the present invention, and the control system utilized to control the strobe lights in the integrating sphere and other components of the present invention. Block 404 is a block diagram representation of the integrating sphere (including the four strobe lights). Block 406 is a block diagram representation of film transport 206. Block 410 is a representation of CCD camera 210 which houses a CCD array (not shown). Block 411 is a representation of a control system utilized to control integrating sphere 404, film transport 406, and CCD camera 410. Control system 411 controls the flashing sequence and the frequency of flashing of the four strobe lights in integrating sphere 404. Control system 411 also commands and controls CCD camera 410 which delivers digital image data to control system 411 for storage and processing.

Figure 5:
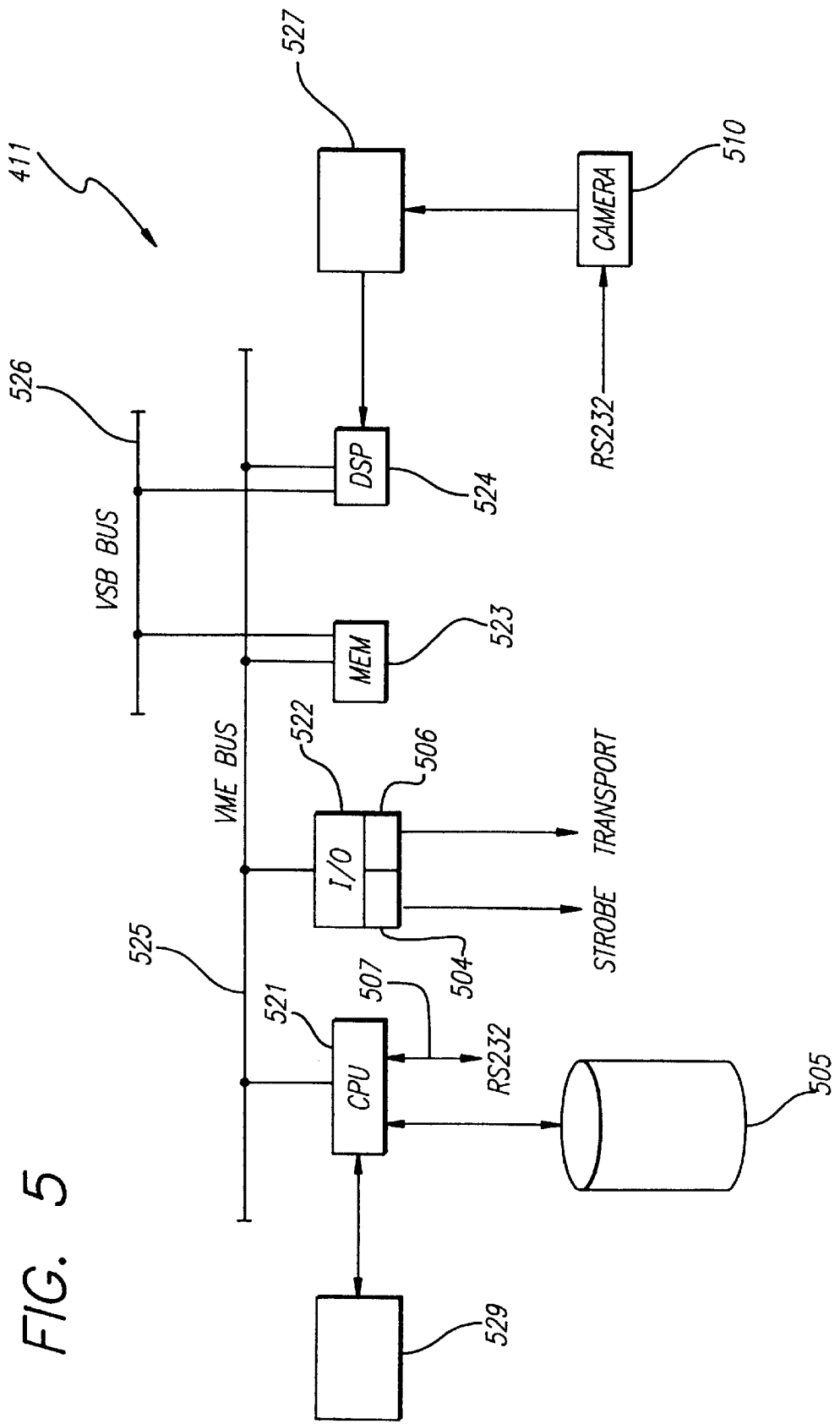
FIG. 5 illustrates the control system of the present invention.

Control system 411 is shown in more detail in FIG. 5. CPU card 521 typically includes 32 megabytes of memory, a single 75 MHz Sun SPARC II with cache and a Sbus video card (for example, a generic Sun brand) for displaying video. CPU card 521 also includes two RS232 ports 507. One of the ports is coupled to, and controls, CCD camera 510 (shown as CCD camera 210 in FIG. 2). CPU card 521 communicates with other components of control system 411 via VME bus 525. A monitor, mouse, and keyboard (none of which is shown in FIG. 5) are also attached to CPU card 521. A disk drive 505 is connected to CPU card 521 via a SCSI bus. Block 529 represents an optional Ethernet connection for moving image data from the control system for use by other users. A Green Spring VME/IP interface card 522 is coupled to VME bus 525. Interface card 522 provides an interface for up to four IP (Industry Packs) cards to VME bus 525. IP 506 controls film transport 206 through an optically-isolated relay panel. IP 504 controls the four strobe lights of integrating sphere 204.

Block 523 represents a RAMIX RM-140B memory card. Memory card 523 is a dual port memory having 64 megabytes of storage space. Memory card 523 can be accessed by either VME bus 525 or VSB bus 526. VSB bus 526 is used to couple memory card 523 to Digital Signal Processor (DSP) 524, and move processed data out of DSP 524 to memory card 523. From memory card 523, the processed data is moved to CPU card 521 via VME bus 525 for final processing and storage. Memory card 523 is used both as a large buffer between DSP 524 and CPU 521, and also as a quick means of transferring data from DSP 524. In control system 411, data rates out of DSP 524 are about 2 Mb per second on VME bus 525, and about 15 Mb per second on VSB bus 526. It is noted that DSP 524 comprises two Spectrum VME DSP carrier boards, and each board includes two DSP processors. The DSP processors are typically Texas Instruments TMS320C40 DSP chips, at either 40 MHz or 50 MHz clock speeds.

Block 527 is an interface block between a Photometrics CCD camera 510 and DSP 524. This interface attaches to buffered COMM ports on the Spectrum VME DSP carrier boards. The data rate on the buffered COMM ports is about 15 Mb per second. The maximum data rate from the Photometrics CCD camera is 2 Mb per second. Finally, as shown in FIG. 5, VME bus 525 provides communication between CPU card 521, interface card 522, memory card 523, and DSP 524.

Figure 3:
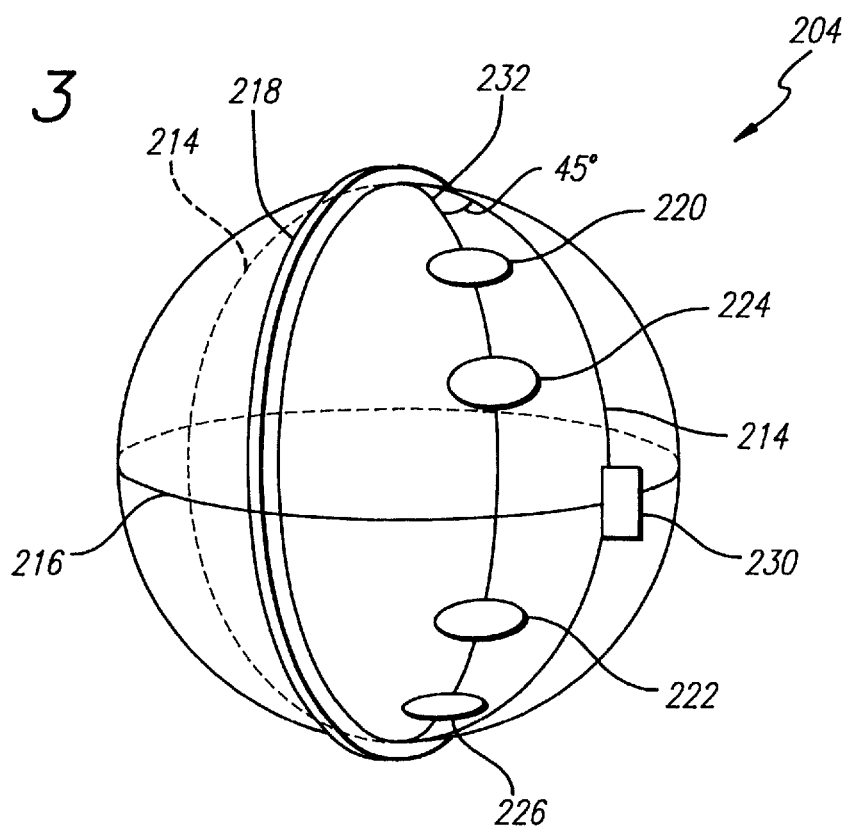
FIG. 3 is an illustration of the integrating sphere according to the present invention.
Figure 6:
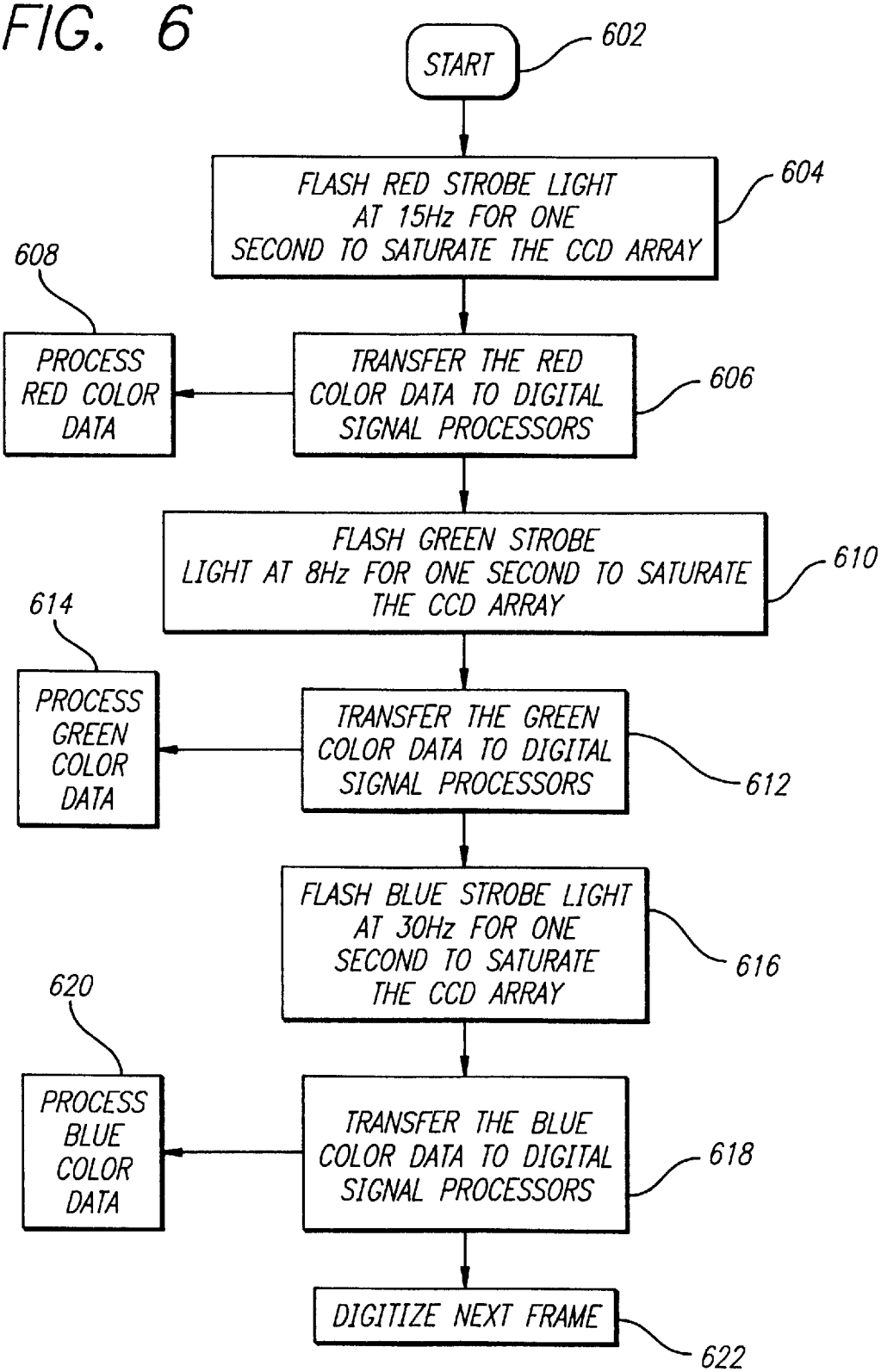
FIG. 6 illustrates one cycle of the film digitizing operation of the present invention for a single film frame.

The operation of the present invention is now discussed by reference to FIG. 6. In step 602, the invention begins one cycle of digitizing a single film frame placed in film plane 202. In step 604, control system 411 (FIGS. 4 and 5) of the invention illuminates integrating sphere 404 (integrating sphere 204 in FIGS. 2 and 3) by flashing red strobe light 220 (FIGS. 2 and 3). According to the invention, the red strobe light is flashed at 15 Hz for one second. Each flash of the red strobe light employed in the present invention produces four joules of light. The flashing frequency of red strobe light 220 (i.e. 15 Hz) is determined by the amount of time required to saturate the CCD array in CCD camera 410 (CCD camera 210 in FIG. 2) with the red light component of a film frame placed in film plane 202 (FIG. 2). According to one embodiment of the invention the CCD array is saturated to a value of 4096 which is 12 bits logarithmic, on a scale of 0 to 4096. In step 606, after the CCD array is saturated with the red light component of light passed through the film frame, the red color digital data is passed from CCD camera 510 (CCD camera 210 in FIG. 2) to shift registers in interface block 527 (FIG. 5). From the shift registers, the red color digital data is passed to the red color channel in DSP 524 (FIG. 5). In step 608, the red color data are processed by DSP 524.

While the red color data are being processed by DSP 524, in step 610 the invention's control system 411 triggers green strobe light 224 to illuminate integrating sphere 404. According to the invention, the green strobe light is flashed at 8 Hz for one second to cause the CCD to become saturated. As with the red strobe light, each flash of the green strobe light employed in the present invention produces four joules of light. The flashing frequency of green strobe light 224 (i.e. 8 Hz) is also determined by the amount of time required to saturate the CCD array with the green light component of the film frame. In step 612, after the CCD array is saturated with the green light component of light passed through the film frame, the green color digital data is passed from CCD camera 510 (CCD camera 210 in FIG. 2) to shift registers in interface block 527 (FIG. 5). From the shift registers, the green color digital data is passed to the green color channel in DSP 524 (FIG. 5). In step 614, the green color data are processed by DSP 524.

While the green color data are being processed by DSP 524, in step 616 the invention's control system 411 triggers the blue strobe lights 222 and 226 to illuminate integrating sphere 404. Blue strobe lights 222 and 226 are simultaneously flashed to saturate the CCD array. Each flash of one of the blue strobe lights employed in the present invention produces four joules of light. According to the present invention the blue strobe lights are flashed at a frequency of 30 Hz for one second to saturate the CCD array. The flashing frequency of the blue strobe lights (i.e. 30 Hz) is also dependent on the amount of time needed to saturate the CCD array with the blue light component of the film frame. As stated above, in another embodiment of the invention a single blue strobe light, instead of two blue strobe lights, are used. In step 618, after the CCD array is saturated with the blue light component of light passed through the film frame, the blue color digital data is passed from CCD camera 510 (CCD camera 210 in FIG. 2) to shift registers in interface block 527 (FIG. 5). From the shift registers, the blue color digital data is passed to the blue color channel in DSP 524 (FIG. 5). In step 620, the blue color data are processed by DSP 524. In step 622, the invention completes the cycle of digitizing a single film frame placed in film plane 202, and the next film frame is then placed in the film plane and digitized.

Each cycle of saturating the CCD array with the red, green, and blue color components is called a "scan." The invention performs three scans, one for each of the red, green, and blue components to digitize the image of each film frame placed in film plane 202 (FIG. 2). Each scan is completed when the CCD array is saturated with the particular light component passed through the film frame. The CCD array is a 2k×3k pixel array. In other words, each scan generates six million pixels of color data. As stated above, each pixel comprises 12 bits of information when the CCD array is fully saturated. Also as stated above, the scan data (i.e. the six million pixels of information) corresponding to each color component is passed to DSP 524. According to the present invention, the digital color data are transferred from CCD camera 510 to DSP 524 at two million pixels per second (i.e., 2 Megabytes per second). Thus, it takes three seconds to transfer the color data corresponding to each color from the CCD camera to the DSP. The DSP's can accept data as fast as 20 Megabytes per second (i.e. 20 million pixels per second).

Thus, the timing sequence for exposing the CCD array to the color data and transferring the color data out of the CCD array to DSP 524 is as follows. One second for exposing the CCD to red color data, followed by a three second transfer of the red color data to DSP 524. While DSP 524 is processing the red color data, the CCD is exposed to the green color data for one second, and another three seconds are consumed for transferring the green color data to DSP 524. While DSP 524 is processing the green color data, the CCD is exposed to the blue color data for one second, and another three seconds are consumed for transferring the blue color data to DSP 524. Thus, a total of twelve seconds are spent in order to capture and pass all color data of a single film frame to DSP 524.

The invention described above has overcome the prior art disadvantages and has resulted in a faster, simpler, more reliable, and less expensive method and apparatus for digitizing films at high resolution. According to the invention, when no strobe light is flashed, no light source exists and the CCD array is not exposed to unwanted light. Thus, the prior art requirement for using shutters, as well as the prior art requirement for colored filters and field flattening optics, are overcome. The need for the prior art complicated mechanism for insertion and removal of filters is also overcome. Moreover, the prior art requirement to synchronize the shutter system with the filter switching mechanism is also overcome. The invention also overcomes the slow speed of the prior art film digitizing apparatus since no filters need be switched to digitize each film frame. Thus, a method and apparatus for digitizing film frames using a stroboscopic scanning system has been described.

I claim:

1. An apparatus for digitizing a film frame comprising:
   an integrating sphere housing a plurality of strobe lights, said strobe lights disposed for generating a plurality of color light flashes;
   control means coupled to said plurality of strobe lights, said control means capable of turning on said plurality of strobe lights in sequence;
   a film plane for holding a film frame for exposure to a light emanating from said integrating sphere;
   a lens for projecting an image of said film frame onto a CCD array, so as to cause said CCD array to digitize said image.

2. The apparatus of claim 1 wherein said plurality of strobe lights comprise one red strobe light, one green strobe light, and one blue strobe light.

3. The apparatus of claim 1 wherein said plurality of strobe lights are placed along a meridian of said integrating sphere.

4. The apparatus of claim 1 wherein said CCD array is an array of 2k by 3k pixels.

5. The apparatus of claim 1 wherein said plurality of strobe lights are pointed to an internal surface of said integrating sphere.

6. The apparatus of claim 5 wherein light reflected from said internal surface is projected onto said film frame through an aperture in said integrating sphere.

7. The apparatus of claim 1 wherein said integrating sphere has an internal coating comprised of rare-earth metals for Lambertian distribution of light.

8. The apparatus of claim 7 wherein said internal coating has an efficiency between ninety and ninety seven percent in reflecting light generated by said plurality of strobe lights.

9. The apparatus of claim 1 wherein light reflected from an internal surface of said integrating sphere is projected onto said film frame through an aperture in said integrating sphere.

10. The apparatus of claim 9 wherein said plurality of strobe lights and said aperture are placed along a meridian of said integrating sphere.

11. The apparatus of claim 10 wherein said aperture is placed on an apex of said meridian.

12. The apparatus of claim 10 wherein said red strobe light is placed above said green strobe light, and said green strobe light is placed above said two blue strobe lights, and wherein said aperture is placed between said green light and said two blue strobe lights.

13. The apparatus of claim 12 wherein said aperture is placed on an apex of said meridian.

14. The apparatus of claim 1 wherein said plurality of strobe lights comprise one red strobe light, one green strobe light, and two blue strobe lights.

15. The apparatus of claim 14 wherein each of said strobe lights are flashed at a desired frequency for a predetermined time.

16. The apparatus of claim 15 wherein said desired frequency for each of said two blue strobe lights is 30 Hz.

17. The apparatus of claim 16 wherein said predetermined time is a time necessary for said CCD array to saturate to a twelve-bit value from a blue color component of said film frame.

18. The apparatus of claim 15 wherein said desired frequency for said red strobe light is 15 Hz.

19. The apparatus of claim 18 wherein said predetermined time is a time necessary for said CCD array to saturate to a twelve-bit value from a red color component of said film frame.

20. The apparatus of claim 15 wherein said desired frequency for said green strobe light is 8 Hz.

21. The apparatus of claim 20 wherein said predetermined time is a time necessary for said CCD array to saturate to a twelve-bit value from a green color component of said film frame.

22. The apparatus of claim 15 wherein said predetermined time is a time necessary for said CCD array to saturate to a twelve-bit value.

23. A method for digitizing a film frame, the method comprising the steps of:
placing a film frame before an integrating sphere housing a plurality of strobe lights for generating a plurality of color light flashes;
exposing said film frame to a monochromatic light by flashing said plurality of lights in sequence;
projecting an image of said film frame onto a CCD array, so as to cause said CCD array to digitize said image.

24. The method of claim 23 wherein said plurality of strobe lights comprise one red strobe light, one green strobe light, and one blue strobe light.

25. The method of claim 23 wherein said CCD array is an array of 2k by 3k pixels.

26. The method of claim 23 wherein said plurality of strobe lights comprise one red strobe light, one green strobe light, and two blue strobe lights.

27. The method of claim 26 wherein each of said strobe lights are flashed at a desired frequency for a predetermined time.

28. The method of claim 27 wherein said predetermined time is a time necessary for said CCD array to saturate to a twelve-bit value.

29. The method of claim 27 wherein said desired frequency for each of said two blue strobe lights is 30 Hz.

30. The method of claim 29 wherein said predetermined time is a time necessary for said CCD array to saturate to a twelve-bit value from a blue color component of said film frame.

31. The method of claim 27 wherein said desired frequency for said red strobe light is 15 Hz.

32. The method of claim 31 wherein said predetermined time is a time necessary for said CCD array to saturate to a twelve-bit value from a red color component of said film frame.

33. The method of claim 27 wherein said desired frequency for said green strobe light is 8 Hz.

34. The method of claim 33 wherein said predetermined time is a time necessary for said CCD array to saturate to a twelve-bit value from a green color component of said film frame.

35. The method of claim 23 wherein said plurality of strobe lights are pointed to an internal surface of said integrating sphere.

36. The method of claim 35 wherein light reflected from said internal surface is projected with Lambertian distribution onto said film frame through an aperture in said integrating sphere.

37. The method of claim 36 wherein said strobe lights and said aperture are placed along a meridian of said integrating sphere.

38. The method of claim 37 wherein said aperture is placed on an apex of said meridian.

39. The method of claim 36 wherein said red strobe light is placed above said green strobe light, and said green strobe light is placed above said two blue strobe lights, and wherein said aperture is placed between said green light and said two blue strobe lights.

40. The method of claim 23 wherein said strobe lights are placed along a meridian of said integrating sphere.

41. The method of claim 23 wherein said integrating sphere has an internal coating comprised of rare-earth metals for Lambertian distribution of light.

42. The method of claim 41 wherein said internal coating has an efficiency between ninety and ninety seven percent in reflecting light generated by said plurality of strobe lights.

43. A source of light for focusing and directing light onto objects placed before said source, said source comprising:
an integrating sphere housing a plurality of strobe lights, said strobe lights disposed for generating a plurality of color light flashes, each of said plurality of strobe lights projecting a monochromatic light onto an internal surface of said integrating sphere;
an aperture in said integrating sphere for focusing and directing light reflected from said internal surface of said integrating sphere onto an object placed before said aperture.

44. The source of light in claim 43 wherein said plurality of strobe lights are placed along a meridian of said integrating sphere.

45. The source of light in claim 43 wherein said object placed before said aperture is a film frame.

46. The source of light in claim 43 wherein said plurality of strobe lights comprise one red strobe light, one green strobe light, and one blue strobe light.

47. The source of light in claim 43 wherein said plurality of strobe lights and said aperture are placed along a meridian of said integrating sphere.

48. The source of light in claim 47 wherein said aperture is placed on an apex of said meridian.

49. The source of light in claim 43 wherein said plurality of strobe lights comprise one red strobe light, one green strobe light, and two blue strobe lights.

50. The source of light in claim 49 wherein said plurality of strobe lights and said aperture are placed along a meridian of said integrating sphere.

51. The source of light in claim 50 wherein said red strobe light is placed above said green strobe light, and said green strobe light is placed above said two blue strobe lights, and wherein said aperture is placed between said green light and said two blue strobe lights.

52. The source of light in claim 51 wherein said aperture is placed on an apex of said meridian.

53. The source of light in claim 43 wherein said internal surface of said integrating sphere has a coating comprised of rare-earth metals.

54. The source of light in claim 53 wherein said coating has an efficiency between ninety and ninety seven percent in reflecting light generated by said plurality of strobe lights.

55. An apparatus for digitizing a film frame comprising:
an integrating sphere having an aperture;
a film plane for holding a film frame;
a first strobe light, a second strobe light, a third strobe light disposed on said integrating sphere for generating a plurality of color light flashes;
control means coupled to said first strobe light, said second strobe light, and said third strobe light, said control means capable of flashing one of said first, second, and third strobe lights to produce from said aperture an evenly distributed monochromatic light on said film plane;
a lens receiving said evenly distributed monochromatic light transmitted through an image of said film frame and projecting a transmitted light onto a CCD array, so as to cause said CCD array to digitize said image.

56. The apparatus of claim 55 wherein said control means flashing said first, second, and third strobe lights in sequence.

57. The apparatus of claim 56 wherein said first, second, and third strobe lights are red, green, and blue lights respectively.

* * * * *

UNITED STATES PATENT AND TRADEMARK OFFICE
CERTIFICATE OF CORRECTION

PATENT NO. : 5,771,109
DATED : June 23, 1998
INVENTOR(S) : David DiFrancesco

It is certified that error appears in the above-identified patent and that said Letters Patent is hereby corrected as shown below:

IN THE HEADING:

Inventor: after "David DiFrancesco" replace "Englewood, Calif." with --San Francisco, Calif.--.

IN OTHER PUBLICATIONS:

page 1, after "Laser Based Color Film Recorder System with GaAs Microlaser" replace "D. Difrancesco" with --D. DiFrancesco--.

Signed and Sealed this

Seventeenth Day of April, 2001

*Attest:*

NICHOLAS P. GODICI

*Attesting Officer*     *Acting Director of the United States Patent and Trademark Office*